July 29, 1947.　　　　J. C. HAUN ET AL　　　　2,424,614
PROCESS AND APPARATUS FOR TREATMENT OF GASES
Filed Jan. 24, 1944　　　3 Sheets-Sheet 2
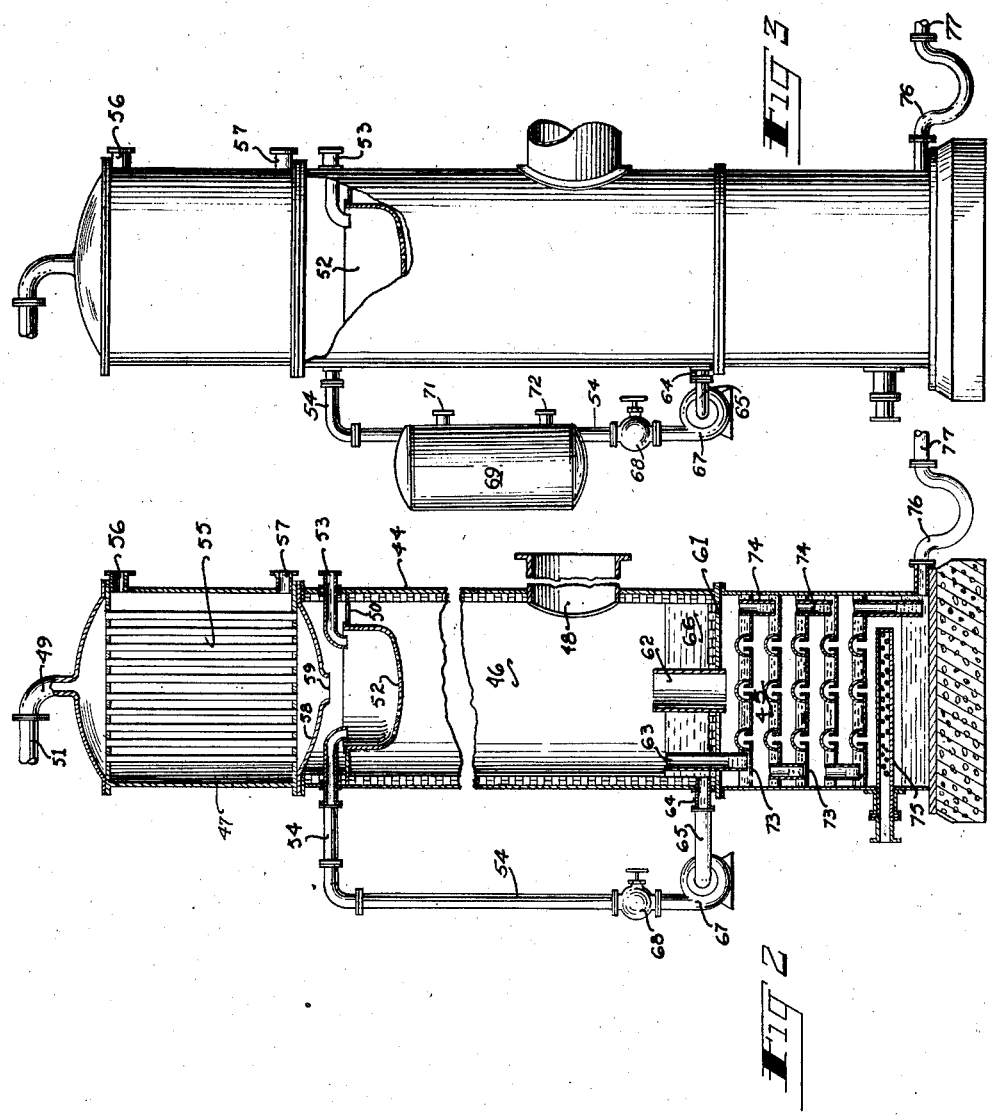
INVENTORS
JOYE C. HAUN
ROBERT E. RICHMOND
HARRY H. RICHMOND
BY
ATTORNEY

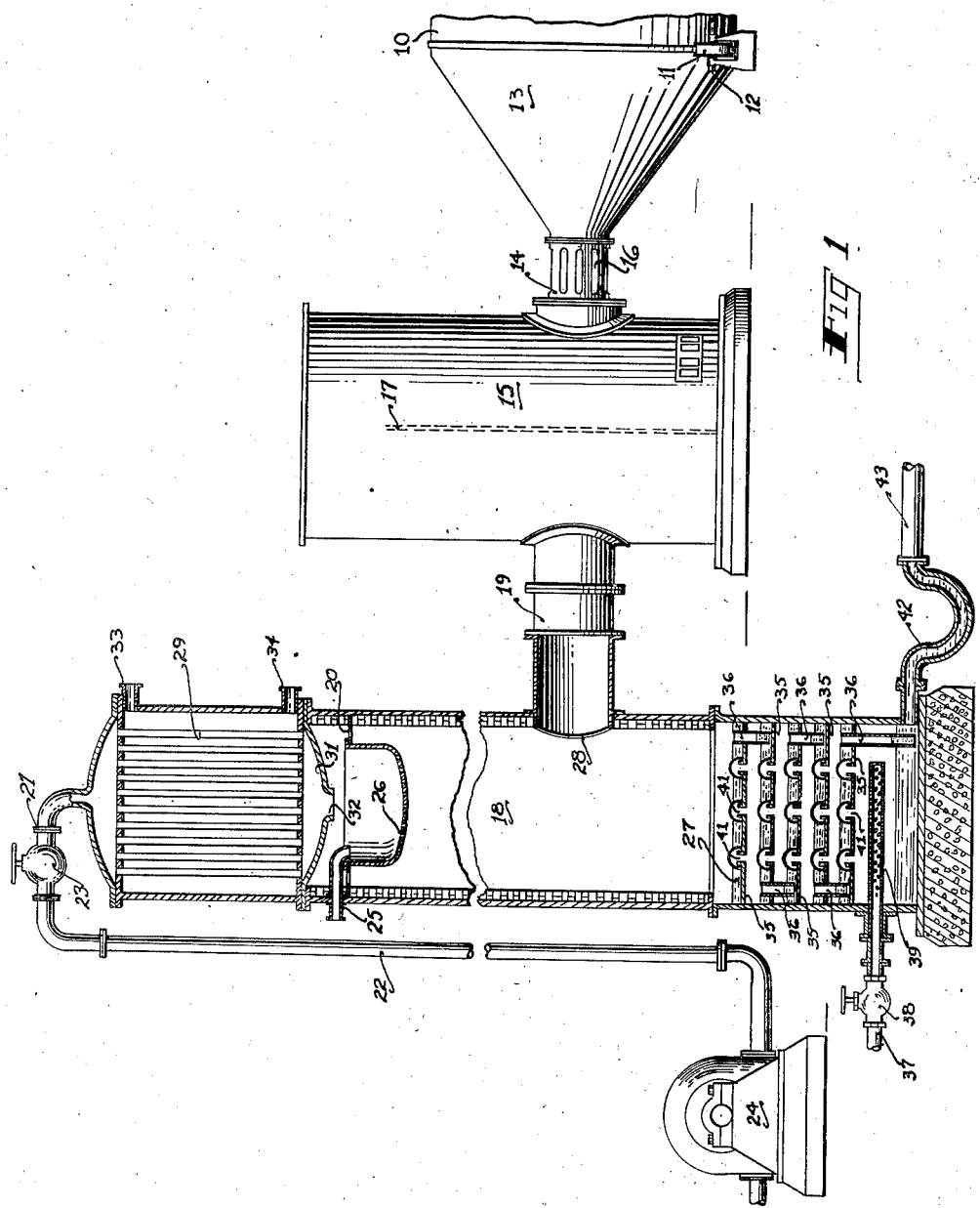

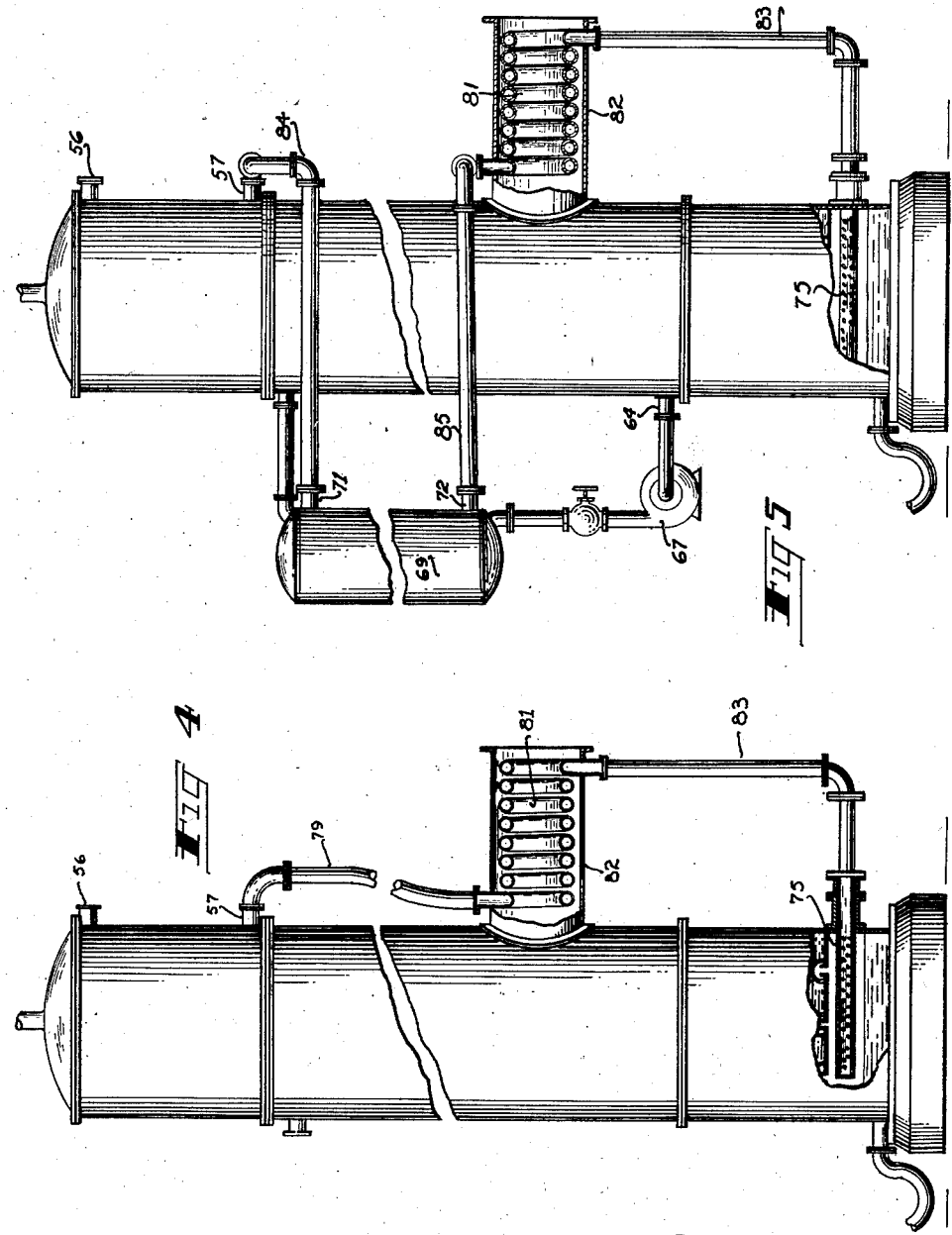

Patented July 29, 1947

2,424,614

UNITED STATES PATENT OFFICE 2,424,614

PROCESS AND APPARATUS FOR TREATMENT OF GASES

Joye C. Haun, San Francisco, Calif., and Robert E. Richmond and Harry H. Richmond, Portland, Oreg., assignors to Electric Steel Foundry, Portland, Oreg., a corporation of Oregon Application January 24, 1944, Serial No. 519,560

18 Claims. (Cl. 183—120)

This invention relates to the treatment of hot gases delivered from gas retorts, coke ovens, producer gas generator sets, combustion chambers or the like, in which the gases to be recovered are found in a mixture with other gases.

In this application the process and apparatus embodying the invention are described as being particularly applicable for the treatment of gases delivered from a sulphur burner, combustion chamber or other source of sulphur dioxide in a mixture with other gases, in connection with the production of acid liquor for use in the manufacture of sulphite pulp. No limitation is intended by such description, the process and apparatus herein claimed being likewise applicable for use in connection with the treatment of gases in other industries.

In the sulphite process, sulphur in the form of brimstone (S) or pyrites ($FeS_2$) is burned in a sulphur burner or pyrites furnace, forming sulphur dioxide gas ($SO_2$). When sulphur is used, the burning is completed in a combustion chamber; when pyrites are burned, a scrubber removes injurious dust. The products of combustion from such burners comprise nitrogen, sulphur dioxide, sulphur trioxide, small amounts of oxygen, carbon dioxide, and other gases, and often some small quantities of entrained solids such as particles of free sulphur and, in the case of pyrites burners, particles of pyrites, iron oxide, and iron salts. Rapid cooling is important in the production of a pure gas. Between 600° and 900° C., a maximum of sulphur trioxide ($SO_3$) is produced; while at temperatures below 400° C. and above 1000° C., practically no $SO_3$ is formed. It is, therefore, important to keep the temperature in the combustion chamber high and to cool the gases after leaving this chamber as quickly as possible.

Heretofore, these gases have been cooled by passing them through an indirect cooler comprising either lead pipes submerged in a pond of cooling water, vertical lead tubes sprayed with a shower of cooling water, or a combination of pond and shower cooled tubes, the cooled gases being drawn through the apparatus by means of a vacuum pump and introduced into two or more absorption towers arranged in series.

In the instant invention, the gases from the pyrites burner or combustion chamber are brought into intimate contact with cooling water made to pass in a counter direction thereto. The water may be sprayed through the ascending gases as in the apparatus hereinafter described, or the gases and the water may be brought into contact by passing them in counter-current flow through a mass of inert interstitial material by which the water and the gases are caused to flow through numerous tortuous passages. It is important that the water is caused to come into intimate contact with all portions of the gas.

During the period of intimate contact of the hot gases with the cooling water, water vapor is formed and is intermingled with the gases passing out of the direct cooling chamber. Upon leaving the direct cooling chamber the cooled gases and water vapor enter a surface condenser wherein the water vapor is condensed and returned to the water supply for re-use as cooling and scrubbing liquid in the direct cooling chamber. The sulphur dioxide and other non-condensible gases are withdrawn from the condenser and delivered to absorption towers or other apparatus for subsequent treatment and use.

The cooling water, flowing in a counter direction to the ascending gases, carries with it some sulphur dioxide in solution, as well as solids scrubbed from the gases during their passage through the direct cooling chamber. Thereupon, the water enters a stripping chamber where heat is supplied to raise the temperature of the solution to approximately the boiling point of water for driving off the sulphur dioxide in solution therein. The sulphur dioxide stripped from the heated liquid is returned to the direct cooling chamber wherein it mixes with the stream of gases flowing therethrough and is recovered therewith. The hot water, condensed steam, and contained impurities collect at the bottom of the stripping chamber and are removed therefrom through suitable piping to a place of disposal.

It is an object of the invention to provide a process for the cooling of heated gases to a temperature suitable for subsequent treatment in absorption towers or other processing equipment; for the treatment of gases by direct contact with water without the loss of any water soluble constituents of the gases through such treatment; for simultaneously cooling and scrubbing gases delivered from a combustion chamber for cleansing such gases of substantially all entrained solids; for simultaneously cooling and scrubbing gases delivered from a combustion chamber and delivering them to further processing equipment without the loss of sulphur dioxide which may be dissolved in the water during the cooling and cleansing operation.

It is a further object of the invention to provide a process for subjecting gases received from a combustion chamber to intimate contact with water for cooling and scrubbing the gases, and for recovering the dissolved gases from such water.

It is a further object of the invention to provide a process for introducing cooling and scrubbing water directly into a stream of gases delivered from a combustion chamber, and for recovering gases dissolved by said water and returning them to said stream.

It is likewise an object of the invention to provide an apparatus in which hot gases are brought into intimate association with water to cool the gases, and to provide means for elevating the temperature of the water for stripping the gas therefrom, and for returning such recovered gases to the stream of gas flowing through the cooling apparatus.

It is a further object of the invention to provide an apparatus for spraying water into the stream of gases delivered from a combustion chamber for cooling the gases, and for subsequently stripping the gases from the solution and returning them to the stream of gases flowing through said apparatus.

It is a further object of the invention to provide an apparatus for introducing water into intimate contact with hot gases for cooling the gases, and having means for stripping dissolved gases from the water, and providing other means for recovering water evaporated from the direct cooling chamber by the heat contained in the hot gases.

An apparatus for practicing the invention is illustrated in the accompanying drawings, in which: Figure 1 is a diagrammatic illustration of an apparatus for practicing the invention, the apparatus for cooling and scrubbing the gases, for condensing the contained water vapor, and for stripping the gases, being shown in section. Figure 2 is a sectional elevation of an apparatus embodying a modification of the structure shown in Figure 1; Figure 3 is a fragmentary sectional elevation of a cooling tower embodying another modification of the invention; Figure 4 is an elevation, partly in section, of another cooling tower embodying the invention, illustrating a different piping arrangement; and Figure 5 is an elevation, similar to Figure 4, illustrating another piping arrangement.

Referring to the drawings, Figure 1 shows an apparatus comprising a rotary burner 10 supported by rollers 11 mounted on a shaft 12 and revolved by means of a gear train (not shown) and which impart to the cylinder of the rotary burner a slow rotating motion. The rear cone 13 of the rotary burner is connected to a short pipe 14 leading to the combustion chamber 15 in which the gases from the burners are mixed with air to secure complete combustion of the sulphur gases. A damper 16, between the rotary burner and the combustion chamber, provides means for regulating the supply of air to the combustion chamber.

The combustion chamber 15 may comprise a brick lined steel chamber in which the gases are intimately mixed. A baffle plate or wall 17 is provided to hold back any dust particles and to assure effective mixing of the gases.

Mounted closely behind the combustion chamber is a direct cooling chamber 18 which may comprise a refractory lined shell. The cooling chamber 18 is directly connected to the combustion chamber 15 by means of a short length of pipe 19 through which gases are delivered from the combustion chamber 15 to the lower portion of the cooling chamber. In the construction illustrated in the drawings, the structure containing the cooling chamber 18 is in the form of a tower having a gas outlet defined by a pipe connection 21 at the upper end of the tower to which is connected a pipe line 22, valved at 23, through which gases are withdrawn from the cooling tower by means of vacuum pump 24. By this means the gases entering the lower portion of the cooling chamber 18 are caused to pass upward through the chamber in counter direction to a flow of cooling water sprayed through the ascending gas. Cold water is supplied through pipe connection 25 at the top of the tower to a foraminated distributor 26 supported in the upper portion of the cooling chamber 18 by means of a spider 20 and from which the water flows in a multiplicity of finely divided streams into intimate contact with all portions of the ascending gas.

Water is supplied to the distributor 26 in sufficient quantity to form a pool 27 at the lower end of the cooling chamber 18 immediately below the gas inlet 28. Thus the hot gases delivered to the cooling chamber are caused to sweep over the surface of the pool 27, as well as to ascend through the cooling water flowing from the distributor 26, causing a continual formation of water vapor which intermingles with the ascending gases. The formation of water vapor in the cooling chamber cools the gases delivered from the combustion chamber 15 and the cooled gases and water vapor enter a surface condenser 29, shown in the drawings as mounted in the tower above the cooling chamber 18. Mounted in the tower, between the condenser 29 and the cooling chamber 18, is a pan 31 having a central opening 32 for directing the flow of refluxed condensate from the surface condenser 29 into the distributor 26.

The ascending gases and water vapor pass upwardly through the spider 20 and enter the surface condenser through the opening 32 of the pan 31. The sulphur dioxide and other non-condensible gases are withdrawn from the condenser by the vacuum pump 24 through the pipe line 22, the water vapor being condensed and returned to the cooling chamber for re-use as cooling and scrubbing liquid. Pipe connections 33 and 34 provide for the flow of water through the surface condenser 29.

The cooling water, passing downward through the cooling chamber 18, carries with it sulphur dioxide in solution, as well as solids scrubbed from the gases entering the cooling chamber. For recovering the dissolved sulphur dioxide from the cooling water there is provided a stripping section comprising, at the lower end of the tower, a plurality of bubble cap plates 35 superimposed one above the other in spaced apart relation. Each bubble cap plate 35 is provided with an overflow pipe 36 having its upper end at an elevation above the plate 35 to assure the presence of a pool of water in the stripping section above each plate. The uppermost overflow pipe 36 is so positioned that the water from the pool 27 flows through the overflow pipe to form a pool of water above the next adjacent plate, and so on until the water overflows from the pool above the lowermost bubble cap plate into the bottom of the stripping section. Each pool of water is of a depth sufficient to submerge the bubble caps which extend over the several openings 41 through each plate.

Steam is admitted through pipe 37, valved at 38, to the distributor 39 in the lower portion of the stripping section. The steam discharged through the distributor 39 rises through the openings in the plates 35 and heats the water flowing through the several pools in the stripping section. As the temperature of the water approaches the boiling point, the sulphur dioxide is driven therefrom and ascends through the openings 41 in the bubble cap plates and is returned to the cooling chamber 18 where it remixes with the gases being cooled and is recovered therewith. The hot water, condensed steam, and contained impurities collect at the bottom of the stripping section and are removed therefrom through the trap 42 and pipe 43 to a place of disposal.

Referring to Figure 2 of the drawings, there is illustrated a tower 44 comprising in the lower portion thereof a stripping section 45; in the middle or intermediate portion thereof a cooling chamber 46, and in the upper portion thereof a cooling and condensing section 47. Heated gases from a combustion chamber or pyrites burner (not shown) are delivered to the cooling chamber 46 through a gas inlet 48. A gas outlet is defined by a pipe connection 49 at the top of the tower, to which is connected the pipe line 51 through which gases are withdrawn by means of a vacuum pump (not shown). At the upper end of the cooling chamber is provided a foraminated distributor head 52 to which cooling water may be delivered from a source of supply by way of pipe line 53, or by way of pipe line 54 comprising a part of a system for recirculating the cooling water presently to be described. The distributor head 52 is supported by means of a spider 50 through which the ascending gases pass as they flow upwardly through the cooling chamber.

Mounted in the cooling and condensing section 47 is a surface condenser 55 having pipe connections 56 and 57 providing for the circulation of cooling water therethrough. The surface condenser provides a means of refluxing the water vapor. A pan 58 having a central opening 59 is positioned to catch the condensate flowing from the surface condenser 55 and deliver it to the distributor head 52.

The lower end of the cooling chamber 46 is closed as by a plate 61 having a central opening defined by a pipe 62 extending therethrough and extending into the cooling chamber 46 to a point above the level of the pool of water which may collect in the lower end of the cooling chamber. An overflow pipe 63 likewise extends through the plate 61, the upper end thereof terminating at a point below the upper end of the pipe 62. This construction permits water to collect in the lower end of the cooling chamber to the depth permitted by the overflow pipe 63. A pipe connection 64, inserted through the wall of the cooling chamber below the upper end of the overflow pipe 63, is connected with a pipe line 65 through which water may be withdrawn from the pool 66 in the lower end of the cooling chamber by means of a pump 67. The water is discharged from the pump through pipe 54, valved at 68, to the distributor head 52 wherein it becomes mixed with the cooling water supplied through the pipe line 53 and the refluxed condensate flowing from the condensing section through the opening 59 in the pan 58.

The structure last hereinabove described may be used effectively for the removal of sulphur trioxide ($SO_3$) from the gases delivered from the combustion chamber. The $SO_3$, being relatively insoluble in cold water, is readily absorbed in water at elevated temperatures, and recirculation of the hot water in the direct cooling chamber provides an effective means of cleansing the gases of this constituent. By effective removal of the $SO_3$ with hot water in the direct cooling chamber, a considerable proportion of the sulphating which takes place in the digesters may be eliminated.

In a modification of the structure shown in Figure 3, the cooling liquid may be withdrawn from the pool 66 through the pipe line 65 by means of the pump 67 and delivered thereby through an indirect cooler 69 mounted in the pipe line 54. The cooler 69 is provided with pipe connections 71 and 72 which provide for the circulation of water therethrough.

The stripping section 45 comprises a series of vertically spaced, superposed bubble cap plates 73. An overflow pipe 74 extends through each plate 73, the upper end of each overflow pipe extending a sufficient height above the plate to insure that the bubble caps are submerged in the pool of water overlying each plate. Water overflowing from the pool 66 through the overflow pipe 63 forms a pool of water overlying the uppermost plate 73 to the depth permitted by the overflow pipe 74. Likewise, the water flowing from the uppermost pool in the stripping section through the overflow pipe 74 forms a pool in the next lower plate 73 to the depth permitted by the second overflow pipe 74, and so on until the water overflows from the pool overlying the lowermost plate 73 through overflow pipe 74 into the lowermost portion of the stripping section. Steam is admitted into the lower portion of the stripping section through the foraminated pipe 75 and rises through the bubble caps in the several plates 73 into intimate contact with the water flowing through the several pools overlying the series of bubble cap plates. The steam supplies heat to the descending liquid, driving off the sulphur dioxide in solution therein, from whence the recovered gas rises through pipe 62 into the cooling chamber 46 wherein it remixes with the gases being cooled and is recovered therewith. The hot water, condensed steam, and contained impurities collect at the bottom of the stripping chamber and are removed therefrom through the trap 76 and pipe 77 to a place of disposal. The internal construction of the tower is the same in Figures 2 and 3.

In Figure 4 is illustrated a piping arrangement, by means of which the cold water, after passing through the surface condenser 55, may be conducted through pipe line 79 to a heat exchanger 81 located in the pipe 82 through which gases are delivered from the combustion chamber (not shown) to the gas inlet 48 in the lower portion of the cooling chamber 46. In the heat exchanger 81 steam is generated from a portion of the heat contained in the hot gases being delivered from the combustion chamber to the direct cooling chamber, the steam generated by this means being delivered through pipe line 83 to the foraminated pipe 75 in the lower portion of the stripping section 45.

By means of the piping arrangement illustrated in Figure 5, cold water is supplied to the surface condenser 55 from a source of supply by way of pipe connection 56, and, after passage through the condenser, is conducted by way of pipe connection 57, pipe line 84, and pipe connection 71 to the indirect cooler 69 mounted in the pipe line 54. From the indirect cooler 69 the water is conducted by way of pipe connection 72 and pipe line 85 to the heat exchanger 81, where steam is generated from a portion of the heat contained in the hot gases passing from the combustion chamber to the indirect cooling chamber. From the heat exchanger 81 steam is introduced into the bottom of the stripping section 45 by way of the foraminated pipe 75.

Any type of indirect heat exchanger may be employed in the delivery pipe 82, such as the standard type of tubular heat exchanger shown, through which the hot gases are passed before being admitted to the cooling chamber, and in which a portion of the heat of these gases is transferred to the water to convert it into steam. Other modifications of the apparatus shown in the drawings will become obvious to those skilled in the art, any one of which would be as effective as that herein disclosed for obtaining the desired results.

Having now described our invention and in what manner the same may be used, what we claim as new and desire to protect by Letters Patent is:

1. The process of treating hot sulphur burner gases which comprises passing the gases and cooling water through a confined space for cooling the gases by intimate contact with the water, collecting a substantial portion of said water away from contact with said gases, passing steam through said collected water to raise the temperature of the water to approximately the boiling point for stripping dissolved gases therefrom and to sweep said stripped gases away from said collected water and back to the flow of gases through said space.

2. The process of treating hot sulphur burner gases which comprises passing the gases and cooling water through a confined space for cooling the gases by intimate contact with the water, collecting a substantial portion of said water away from contact with said flow of gases, heating said collected water to approximately the boiling point for stripping dissolved sulphur dioxide therefrom, and displacing said stripped sulphur dioxide with an atmosphere free of sulphur dioxide to sweep said stripped sulphur dioxide away from said collected water and back to the flow of gases through said space.

3. The process of treating heated gases which comprises passing said gases and cooling water through a confined space for cooling the gases by intimate contact with the water, collecting a substantial portion of said water away from contact with the flow of gases in said confined space, passing steam which is free of said gases through said water to raise the temperature of the water to a point at which any soluble constituent absorbed from said gases by said cooling water may be stripped from the solution and causing said steam to sweep said stripped constituent away from said collected water and back to the flow of gases passing through said space.

4. The process of treating heated gases containing gases soluble in water which comprises passing said gases and cooling water through a confined space for cooling the gases by intimate contact with the water, condensing the water vapor contained in the exit gases and refluxing the condensate to said space, forming a water seal, collecting the heated cooling water and condensate separated from contact with said flow of gases by said water seal, passing live steam which is free of said gases through said collected water for stripping dissolved gases therefrom and for sweeping said stripped gases away from said collected water and back to the flow of gases through said space, and withdrawing said water from which said dissolved gases have been stripped from further contact with said soluble gases.

5. The process of treating heated gases containing gases appreciably soluble in water at temperatures not exceeding 212° F., which comprises passing said gases and cooling water in countercurrent flow through a confined space for cooling the gases by intimate contact with the water, recirculating the heated cooling water through said space for obtaining a more intimate contact with the gases passing therethrough, condensing the water vapor contained in the exit gases and refluxing the condensate to said space, collecting a substantial portion of the heated cooling water away from contact with said flow of gases, passing live steam which is free of said gases through said water for stripping dissolved gases therefrom and for sweeping said stripped gases away from said collected water and back to the flow of gases through said space, and withdrawing said water from which said dissolved gases have been stripped from further contact with said soluble gases.

6. An apparatus for cooling heated sulphur dioxide containing gases which are unsaturated with respect to water vapor; comprising a direct cooling chamber, means for moving said gases through said chamber, means for creating a spray of water in said chamber in counter direction to the flow of gas through said chamber for cooling said gases, a stripping chamber for receiving the water flowing from said cooling chamber, means for excluding said moving gases from said stripping chamber, means in said stripping chamber for heating said water to approximately the boiling point of the water for recovering the sulphur dioxide gas therefrom, and means for returning said recovered gas to said cooling chamber for remixing with the gases passing through said chamber.

7. An apparatus for cooling heated gases which are unsaturated with respect to water vapor and which contain water soluble components, comprising a tower containing a direct cooling chamber and a stripping chamber, means for moving said gases through said cooling chamber, means for spraying water into intimate contact with the gases passing through said chamber, means for conducting said water from said cooling chamber to said stripping chamber, means for excluding said moving gases from said stripping chamber, means in said stripping chamber for heating said water to approximately the boiling point of the water for recovering the soluble gases therefrom, and means for returning said recovered gases to said direct cooling chamber for remixing with the gases passing through said chamber.

8. An apparatus for cooling heated gases containing gases soluble in water, comprising a direct cooling chamber, means for moving said gases through said chamber, means for creating a flow of water through said chamber in counter direction to the flow of gases through said chamber, a condenser mounted in the path of the exit gases in which water evaporated from the direct cooling chamber by the heat contained in the hot gases is condensed and refluxed to said cooling chamber, a stripping chamber for receiving the water flowing from said cooling chamber, a water seal between said direct cooling chamber and said stripping chamber, means in said stripping chamber for heating said water to approximately the boiling point of the water for recovering soluble gases therefrom and for returning said recovered gases to said direct cooling chamber for remixing with the gases moving through said chamber to substantially eliminate said soluble gases from the atmosphere of said stripping chamber.

9. An apparatus for cooling heated gases comprising a tower having a surface condenser in its top portion, a direct cooling chamber in its mid portion, and a stripping chamber in its bottom portion, a water seal between said direct cooling chamber and said stripping chamber, a cooling water distributor beneath said condenser for passing cooling water downwardly through said direct cooling chamber to said seal and thence into said stripping chamber, a gas inlet above said seal for passing said gases upwardly through said direct cooling chamber and condenser whereby water removed from said gases by said condenser is refluxed through said distributor along with said cooling water, means for introducing into said stripping chamber a fluid heating medium which is free of said gases to strip dissolved gases from the water collected therein and to sweep said stripped gases out of said stripping chamber and through said seal to the gas flow through said cooling chamber, and means to remove water from said stripping chamber and from further contact with said gases.

10. In a gas cooling and absorbing system, a direct cooling chamber, means for delivering heated gases to said chamber, means for delivering cooling water to said chamber to flow in intimate contact with said gases, a condenser arranged in the path of the exit gases in which water evaporated from the direct cooling chamber by the heat contained in the hot gases is condensed and refluxed to the direct cooling chamber, a heat exchanger arranged in the path of hot gases being delivered to said direct cooling chamber in which a portion of the heat of the gases is used for generating steam, and means for conducting cooling water from said condenser to said heat exchanger.

11. An apparatus for cooling heated gases containing gases soluble in water, comprising a direct cooling chamber, means for moving said gases through said chamber, means for creating a flow of water through said chamber in intimate contact with said flow of gases, a stripping chamber in the bottom of said direct cooling chamber receiving said flow of water, a water seal between said chambers, means for introducing live steam into the lower portion of said stripping chamber for recovering the soluble gases absorbed by the water delivered to said chamber and for sweeping said gases out of the atmosphere of said stripping chamber and through said water seal for remixing with the gases passing through said direct cooling chamber, and means for withdrawing the water from said stripping chamber from which said gases have been stripped from further contact with the said gases.

12. In a gas cooling and absorbing system, a direct cooling chamber, means for delivering heated gases to said chamber, means for delivering cooling water to said chamber to flow in intimate contact with said gases, a stripping chamber for receiving the heated cooling water from said direct cooling chamber, a heat exchanger arranged in the path of hot gases being delivered to said direct cooling chamber in which a portion of the heat of the gases is used for generating steam, means for introducing said steam to said stripping chamber, means for intimately contacting the water in said chamber with the steam for stripping the soluble gases absorbed by the water in the direct cooling chamber, and means for returning said gases to said direct cooling chamber for remixing with the gases in said chamber.

13. In a gas cooling and absorbing system, a direct cooling chamber, means for delivering heated gases to said chamber, means for delivering cooling water to said chamber to flow in intimate contact with said gases, a stripping chamber, means for separating the atmospheres of said two chambers, means for conducting heated cooling water from said direct cooling chamber to said stripping chamber, means for introducing steam to said stripping chamber for intimately contacting the water in said chamber with the steam for stripping the soluble gases absorbed by the water in the direct cooling chamber and for sweeping said gases out of the atmosphere of the stripping chamber to return said gases to said direct cooling chamber for remixing with the gases in said chamber, and means for withdrawing said water from which the said gases have been stripped from further contact with the said gases.

14. An apparatus for cooling heated gases containing gases soluble in water, comprising a direct cooling chamber, means for delivering heated gases to said chamber, means for intimately mixing cooling water with the gases in said chamber, indirect heat exchange means in the upper portion of said cooling chamber for refluxing from the exit gases water vapor evaporated from said cooling chamber by the heat contained in said gases, means in the bottom of said direct cooling chamber for stripping gases dissolved by the water in said direct cooling chamber and for sweeping said gases out of said stripping means and back to said direct cooling chamber for remixing with the gases in said chamber, and means for withdrawing said water from which the said gases have been stripped from further contact with the said gases.

15. An apparatus for cooling heated gases containing gases soluble in water, comprising a direct cooling chamber, means for moving said gases through said chamber, means for creating a flow of water through said chamber in counter direction to the flow of gases through said chamber, means for recirculating said water through said chamber for obtaining a more intimate contact between the water and the gases in said chamber, means for refluxing to said chamber water vapor evaporated by the heat contained in said gases, means in the bottom of said direct cooling chamber for stripping gases dissolved by the water in said direct cooling chamber, for sweeping said gases away from said water after stripping and for returning said gases to said direct cooling chamber, and means for withdrawing said water from which the said gases have been stripped from further contact with the said gases.

16. In a gas cooling and absorbing system, a gas cooling tower, means for delivering heated gases to the lower portion of said tower, means for moving said gases through said tower, means for delivering a cooling medium to the top of said tower to flow in contact with and in countercurrent direction to said gases, means for recirculating the cooling medium from the lower portion of said tower to the top of the tower for obtaining a more intimate contact between the cooling medium and said gases, a condenser mounted in the path of the exit gases for refluxing to the cooling tower water evaporated by the heat contained in the hot gases, a heated chamber in communication with said tower, means for delivering the heated cooling water from said tower to said chamber for stripping soluble gases absorbed by the water in the cooling chamber, means for withdrawing said water from which the said gases have been stripped from further contact with the said gases and means for sweeping said stripped gases out of said heated chamber and for returning said gases to said cooling chamber.

17. In a gas cooling and absorbing system, a gas cooling tower, means for delivering heated gases to the lower portion of said tower, means for moving said gases through said tower, means for delivering cooling water to the top of said tower to flow in contact with and in countercurrent direction to said gases, means for recirculating the cooling water from the lower portion of said tower to the top of the tower for obtaining a more intimate contact between the cooling water and said gases, means for cooling the water recirculated from the lower portion of the tower before returning the water to the top of the tower, means at the bottom of the tower for withdrawing water from the system and from further contact with the said soluble gases, means for stripping soluble gases absorbed by the water in the cooling tower from the water before it is withdrawn from the system and means for sweeping said stripped gases from the lower portion of the tower and returning them to the flow of delivered gases.

18. In a gas cooling and absorbing system, a direct cooling chamber, means for delivering heated gases to said chamber, means for delivering cooling water to said chamber to flow in intimate contact with said gas, a condenser arranged in the path of the exit gases in which water evaporated from the direct cooling chamber is condensed and refluxed to said chamber, a stripping chamber for receiving the heated cooling water from said direct cooling chamber, a heat exchanger arranged in the path of the hot gases being delivered to said direct cooling chamber in which a portion of the heat of the gases is used for generating steam, means for introducing said steam to said stripping chamber, and means for conducting the cooling water discharged from said condenser to a place of use in said system.

JOYE C. HAUN.
ROBERT E. RICHMOND.
HARRY H. RICHMOND.

REFERENCES CITED

The following references are of record in the file of this patent:

UNITED STATES PATENTS

| Number | Name | Date |
|---|---|---|
| 1,817,667 | Blau | Aug. 4, 1931 |
| 1,999,546 | Pyzel | Apr. 30, 1935 |
| 931,868 | Hegeler | Aug. 24, 1909 |
| 1,599,490 | Richter et al. | Sept. 14, 1926 |
| 1,046,915 | Wedge | Dec. 10, 1912 |
| 1,992,295 | De Jahn et al. | Feb. 26, 1935 |
| 2,333,193 | Persson et al. | Nov. 2, 1943 |
| 1,463,363 | Jacobus | July 31, 1923 |